Figure 1:
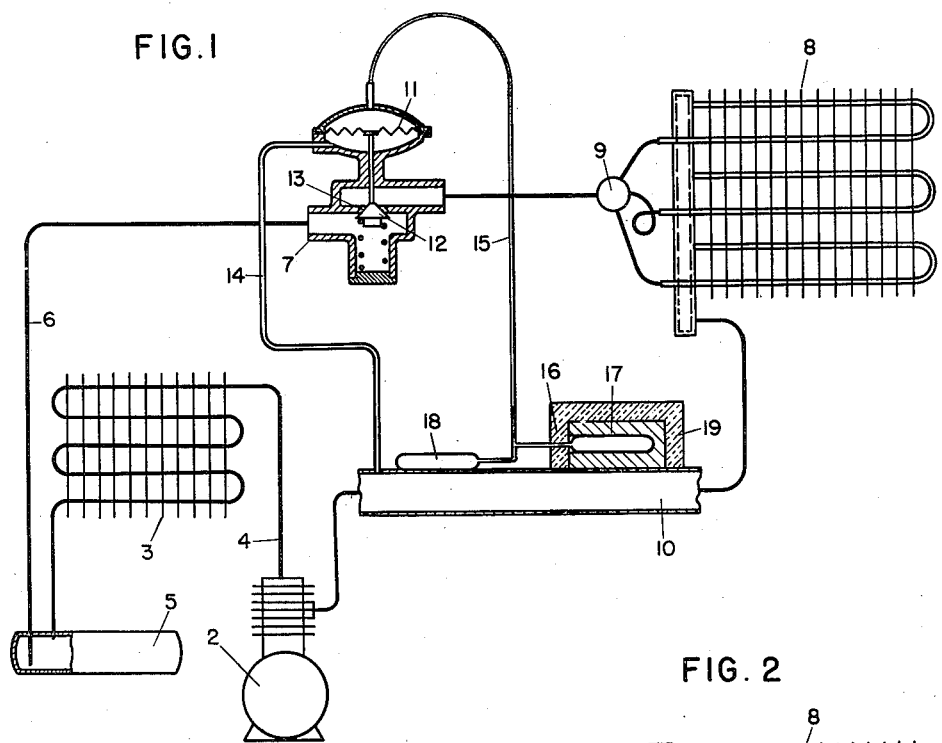

Dec. 11, 1951  W. L. McGRATH  2,577,902
CONTROL BULB FOR THERMAL EXPANSION VALVES
Filed Feb. 24, 1947  3 Sheets-Sheet 1

INVENTOR.
William L. McGrath
BY

Dec. 11, 1951 W. L. McGRATH 2,577,902
CONTROL BULB FOR THERMAL EXPANSION VALVES
Filed Feb. 24, 1947 3 Sheets-Sheet 2

INVENTOR.
BY William L. McGrath

Dec. 11, 1951   W. L. McGRATH   2,577,902
CONTROL BULB FOR THERMAL EXPANSION VALVES
Filed Feb. 24, 1947   3 Sheets-Sheet 3

INVENTOR.
BY William L. McGrath

Patented Dec. 11, 1951

2,577,902

UNITED STATES PATENT OFFICE 2,577,902

CONTROL BULB FOR THERMAL EXPANSION VALVES

William L. McGrath, Syracuse, N. Y., assignor to Carrier Corporation, Syracuse, N. Y., a corporation of Delaware Application February 24, 1947, Serial No. 730,605

14 Claims. (Cl. 62—8)

This invention relates to refrigeration systems including a thermal expansion valve for regulating passage of refrigerant to the evaporator and equipped with suitable means to prevent "hunting" or cycling of the expansion valve when the system is in operation.

"Hunting" or cycling of the expansion valve in a refrigeration system results from an unfavorable relationship between throttling range on the valve, valve size, valve throttling characteristic, length of circuit and hence time delay in the evaporator, and speed of response of the control bulb. This problem creates considerable difficulty resulting in unstable operation, unsatisfactory evaporator conditions, and may cause damage to the compressor because of repeated cut-in and cut-out from suction pressure. To eliminate the disadvantage, it has been proposed to provide the control bulb with considerable mass to render it impossible for the bulb to move the valve quickly, permitting the valve to be moved only at a relatively slow rate. Unfortunately, this proposal is not effective for if there is a sudden change in load imposed upon the evaporator the valve is incapable of moving sufficiently rapidly to correct for the sudden change; as a result, liquid refrigerant is permitted to feed through the evaporator, carrying over to the compressor with resulting damage to the compressor.

The chief object of the present invention is to provide a refrigeration system of the compressor-condenser-expander type in which the expansion valve is so controlled that "hunting" or cycling is obviated.

An object of the present invention is to provide a regulating or control member for a thermal expansion valve which obviates "hunting" or cycling.

A further object is to provide a refrigeration system of the compressor-condenser-expander type in which the expansion valve is so controlled as to prevent rapid movement of the expansion valve under normal operating conditions, but to give rapid response to an abnormal decrease in superheat.

A still further object is to provide a refrigeration system of the compressor-condenser-expander type including a conventional expansion valve in which the elements are so disposed as to eliminate cycling of the valve without substantial increase in cost of the system. Other objects of my invention will be readily perceived from the following description.

This invention relates to a refrigeration system of the compressor-condenser-expansion type which comprises, in combination, a thermal expansion valve for regulating flow of refrigerant to the evaporator, and a thermal expansion system responsive to superheat in the suction line for actuating the expansion valve to move toward open or closed positions, said system including a first member and a second member disposed adjacent the suction line and responsive to superheat therein, one of said members responding more rapidly to a change in temperature in the suction line than the other member.

This invention further relates to a method of operation of a thermal expansion valve disposed in a refrigeration system of the compressor-condenser-expander type, in which the steps consist in regulating the response of the expansion valve to prevent "hunting" by actuating the valve to respond promptly to an abnormal decrease in super-heat in the suction line and to retard response of the valve to normal changes in superheat in the suction line.

The attached drawings illustrate certain prefered embodiments of my invention, in which Figure 1 is a diagrammatic view of a conventional refrigeration system including the control means of the present invention in exaggerated scale; and Figures 2, 3, 4, and 5 are diagrammatic views illustrating modifications of the present invention.

Referring to the drawings, there is illustrated a conventional refrigeration system of the compressor-condenser-expander type including the regulating means of the present invention. The system comprises a compressor 2, a condenser 3 connected to the compressor by discharge line 4, and a receiver 5 adapted to receive condensed liquid refrigerant, the condensed liquid refrigerant passing through liquid line 6 to a thermal expansion valve 7 which regulates the passage of refrigerant to evaporator 8 through a distributor 9 which supplies the refrigerant to the various coils of evaporator 8. Refrigerant is evaporated in evaporator 8, the gaseous refrigerant returning through suction line 10 to compressor 2.

Expansion valve 7 may be conventional and includes a diaphragm 11 adapted to move a valve member 12 toward and from a port 13 to regulate passage of refrigerant through the valve. Pressure is imposed against one side of diaphragm 11 by means of equalizer line 14 connected to suction line 10. Pressure is imposed against the opposite sides of diaphragm 11 through a capillary tube 15 connected to a thermal responsive element 16 disposed adjacent the suction line 10. The chamber in valve 7 above diaphragm 11, capillary tube 15 and element 16, preferably, are gas charged; that is, such members are filled with saturated gas at a temperature representing the normal upper limit of suction line temperature. During operation at normal temperature ranges, a minor quantity of liquid is present and such liquid will locate at the coldest point of element 16.

Element 16 consists of two chambers 17 and 18 connected to one another and to capillary tube 15. The wall of chamber 17 may be thicker than the wall of chamber 18; thus, the "fill" in chamber 18 responds more quickly to a change in superheat in suction line 10 than the "fill" in chamber 17 since the wall of chamber 17 having a heavier mass will not warm or cool as quickly as the wall of chamber 18 which possesses less mass. Insulation 19 may be placed about chamber 17 to shield the same against ambient atmosphere. Under normal operating conditions, the temperature in both chambers may be approximately the same, say 50° F. If desired, of course, the walls of chambers 17 and 18 may be more nearly the same thickness, the wall of chamber 17 being made of a heavy material of low thermal conductivity such as stainless steel while the wall of chamber 18 may be made of a material having a high thermal conductivity such as copper. In either case, it is desirable that the connection between the chambers be so arranged as to prevent flow of condensed refrigerant from one chamber to the other so that the only movement of "fill" between the chambers will be in the form of gas.

In operation, assume the thermal system is controlling the expansion valve at a stable point and that an increase in super-heat occurs due to a change in load. Suction line 10 warms and the wall of chamber 18, having relatively small mass, warms quickly; the wall of chamber 17, having a relatively greater mass, warms more slowly. Since, under the circumstances, chamber 17 is colder than chamber 18, any liquid in chamber 18 evaporates and condenses in chamber 17. Pressure imposed upon the diaphragm 11 of expansion valve 7, therefore, corresponds to the temperature in chamber 17. Instead of the valve 7 opening quickly, its action is retarded and occurs only at the rate of speed with which the wall of chamber 17 changes in temperature. Thus, on a rise in temperature the opening of valve 7 is retarded.

Assume, however, a decrease in superheat such as might occur if air flow over the evaporator were discontinued suddenly. The temperature of the suction line reduces; the wall of chamber 18, having less mass than the wall of chamber 17, permits a rapid response. Chamber 18 is then colder than chamber 17; liquid in chamber 17 evaporates and condenses in chamber 18. In such case, the pressure imposed against the diaphragm 11 of valve 7 will correspond to the temperature of chamber 18. On a reduction in superheat indicating a reduction in load, valve 7 thus responds quickly, as is customary in conventional expansion valves, but upon an increase in superheat indicating an increase in load, valve 7 will respond slowly, its response being retarded to the degree determined by the mass of the wall of chamber 15. "Hunting" or cycling which occurs when an expansion valve responds quickly in both opening and closing directions is greatly retarded or substantially eliminated.

Figure 2:
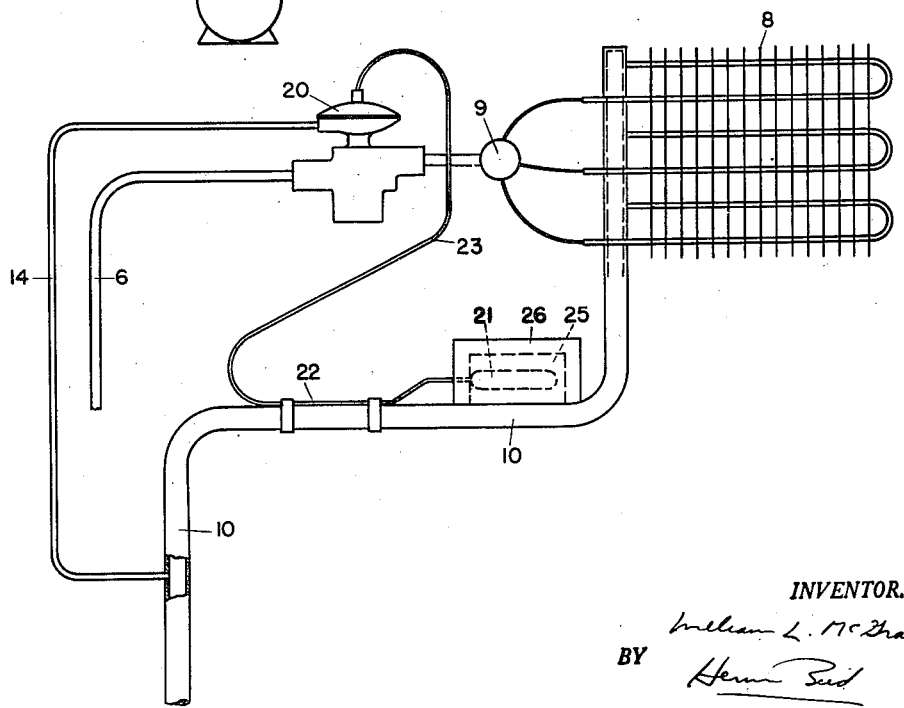

In Figure 2, there is illustrated a modification of the present invention. A conventional expansion valve 20 and thermal responsive element 21 may be employed. A sufficient portion 22 of capillary tube 23 is placed in firm contact with suction line 10 and is secured in place by any suitable means. In effect, therefore, such portion 22 of tube 23 fulfills the same purpose as chamber 18 of element 16, previously described. Bulb 21 then fulfills the same purpose as chamber 17 of element 16, previously described. Preferably, for the purpose of retarding the action of expansion valve 7, bulb 21 is disposed within an opening in metal member 25 clamped by any suitable means in desired position on the suction line. Insulation material 26 is placed in position to shield member 25 from ambient atmosphere. In connection with the type of control illustrated in Figure 2, it is recommended that portion 22 of capillary tube 23 be placed in such a position adjacent the suction line 10 that the liquid of the "fill" cannot flow into bulb 21. Preferably, portion 22 forms the low point of the capillary tube system.

Figure 3:
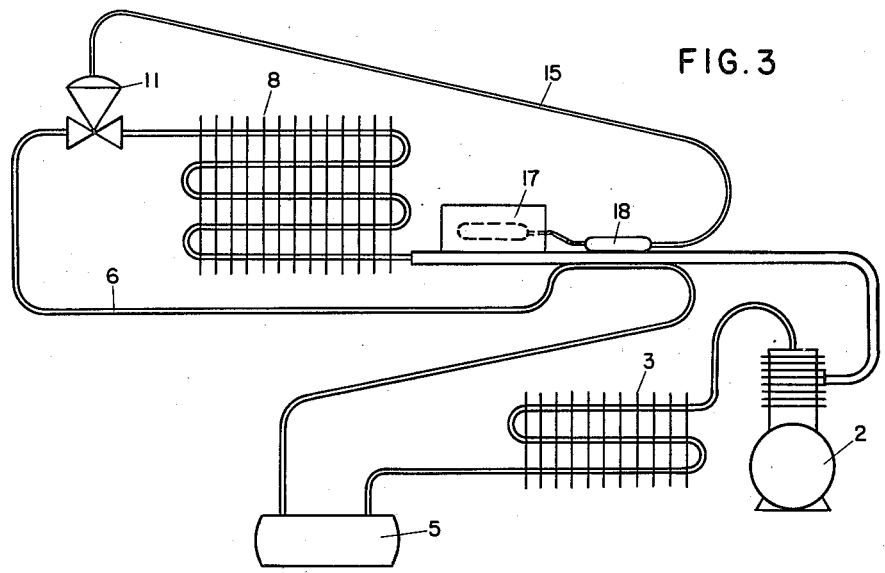
Figure 4:
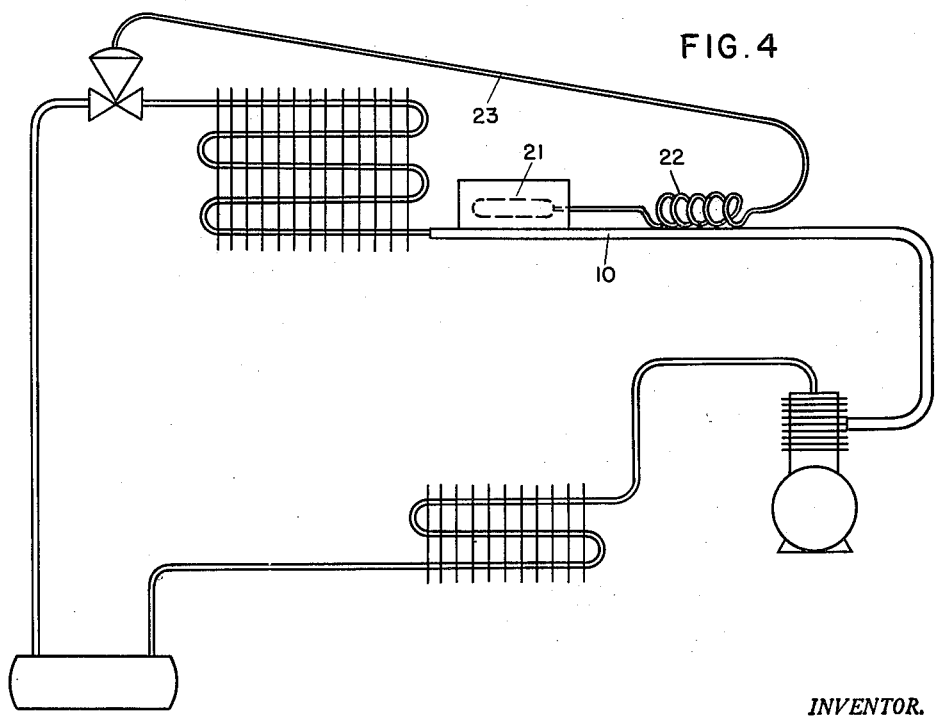

In Figures 3 and 4, I have illustrated further modifications of my invention. The system shown in Figure 3 is essentially the same as the system shown in Figure 1 except that a portion of liquid line 6 is brought into heat exchange relation with suction line 10 adjacent chamber 18. By this means, chamber 18 is maintained at a different temperature than chamber 17, say 55° F., while chamber 17 is maintained at say 50° F. The system shown in Figure 4 is similar to the system illustrated in Figure 2 except that portion 22 of capillary tube is in the form of a coil, for example, having sections thereof extending into ambient atmosphere away from suction line 10. Temperature in portion 22 is thus maintained somewhat higher than the temperature in bulb 21, say 55° F., as compared to 50° F.

In operation of the systems shown in Figures 3 and 4, bulbs 17 and 21 serve to control operation of valve 11 during a normal operating range. If abnormal conditions are encountered such as a sudden reduction of air flow over the evaporator during use or the effect of pull-down during starting-up of the system, resulting in an abnormal decrease in superheat in suction line 10, bulbs 18 and 22 serve in effect as limiting controls to control operation of the system until the superheat increases to the normal operating range of the system. The controls shown in Figures 3 and 4 in effect serve to actuate the expansion valve to respond promptly to an abnormal decrease in superheat in the suction line and to retard response of the valve to normal changes in superheat in the suction line.

In comparing the systems illustrated in Figures 1 and 2 with the systems illustrated in Figures 3 and 4, it will be noted the systems first described serve to retard response of the expansion valve to an increase in superheat in the suction line above a normal operating point while permitting rapid response to a decrease in superheat below a normal operating point. In the systems illustrated in Figures 3 and 4 normal operation of the expansion valve is permitted during a normal operating range but upon an abnormal decrease in superheat below such range rapid response of the expansion valve is permitted.

It will be understood, if desired, insulation material may be disposed between the suction line and bulb member 17 having a heavier wall, in order to aid in delaying the response of the bulb member. Generally, of course, it is undesirable to dispose insulation between the bulb member and the suction line since it is extremely difficult to obtain precisely the desired effect. In all cases, however, it is preferable to dispose insulation material about the bulb having a heavier wall, in order to shield it against ambient atmosphere; so shielding such bulb member renders it responsive to temperature in the suction line and prevents erratic operation by exposure to ambient atmosphere.

Figure 5:
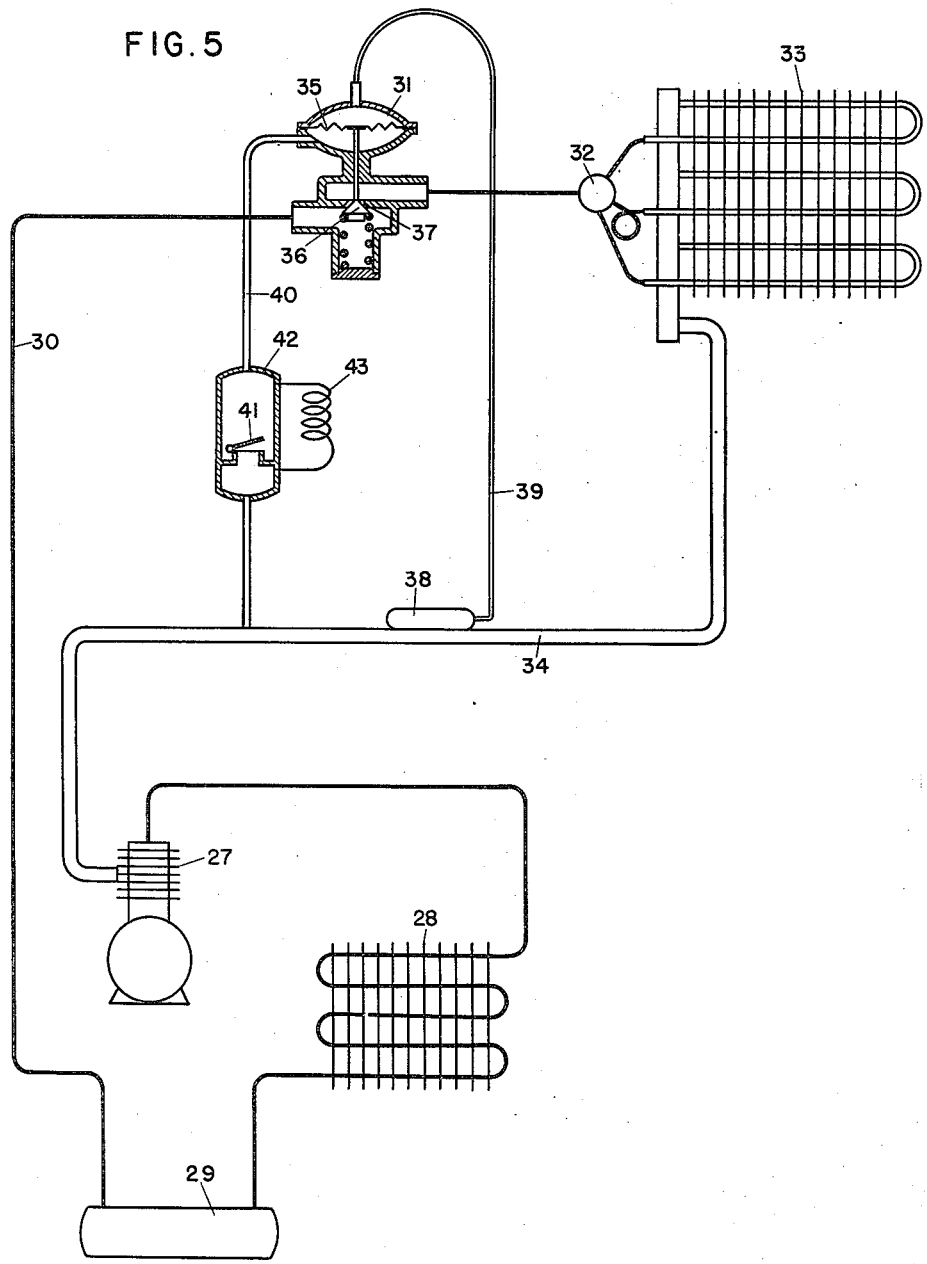

In Figure 5, a further modification of the invention is illustrated. The refrigeration system shown is conventional and consists of compressor 27 connected to condenser 28 which in turn is connected to receiver 29. Liquid line 30 connects receiver 29 with expansion valve 31 which regulates passage of refrigerant to distributor 32 and evaporator 33, the evaporated refrigerant returning to compressor 27 through suction line 34. Expansion valve 31 includes an expansible member such as diaphragm 35 adapted to move valve member 36 towards and from a port 37 to regulate passage of refrigerant through the valve. Pressure is imposed against one side of diaphragm 35 by means of a gas filled thermal responsive element 38 connected to valve 31 by capillary tubing 39. Pressure is imposed against the opposite side of diaphragm 35 through equalizer line 40 connecting valve 31 with suction line 34. A check valve 41 and chamber 42 to increase volume or capacity are disposed in equalizer line 40. A restriction 43 forms a bypass about check valve 41.

Upon an increase in superheat, check valve 41 is closed; pressure imposed against diaphragm 35 falls slowly at a rate determined by restriction 43. Thus upon an increase in superheat caused by an increase in load, the valve 31 responds slowly. Upon a decrease in superheat caused by a decrease in load, the higher pressure opens check valve 41 permitting said pressure to be imposed immediately against diaphragm 35. The system shown responds quickly to a decrease in load preventing liquid refrigerant from passing through the evaporator but responds slowly, the action of the expansion valve being retarded, to an increase in load thus decreasing or eliminating "hunting" tendencies of the expansion valve.

The operation of the system shown in Figure 5 is not identical to the operation of the system shown in Figure 1. In the system shown in Figure 5. any movement to open the expansion valve is delayed or retarded while in the system illustrated in Figure 1 movement to open the expansion valve is delayed only when the temperature of the suction line exceeds the normal value as measured by chamber 17.

It is possible that under very unusual circumstances, it may be desirable to combine the control system shown in Figure 5 with any of the systems shown in Figures 1–4 inclusive. In such case, the pressure imposed against one side of the valve diaphragm would be regulated as shown in Figure 5 while pressure imposed against the opposite side of the valve diaphragm would be regulated as shown in the control systems illustrated in Figures 1–4 inclusive. Such a control system is not required in normal applications but may be of utility in connection with unusual applications.

The present control system eliminates to all practical purposes "hunting" or cycling of a thermal expansion valve employed in a refrigeration system. The control means proposed for such purpose are inexpensive and simple to install. As a practical matter, the present invention has materially improved performance of refrigeration systems of the compressor-condenser-expander type by substantially eliminating "hunting" or cycling of the expansion valve.

While I have described and illustrated certain preferred embodiments of my invention, it will be understood my invention is not limited thereto since it may be otherwise embodied within the scope of the following claims.

I claim:

1. In a refrigeration system of the compressor-condenser-expander type, the combination of an expansion valve for regulating passage of refrigerant to the evaporator, a heat conductive member placed in contact with the suction line of the system and having an opening therein to receive a thermal responsive element, a thermal responsive element responsive mainly to temperature of refrigerant in the suction line of the system placed in the opening in said member, a line connecting the element with the expansion valve, said line and element being gas charged and containing a minor quantity of volatile liquid, a portion of the line being disposed in contact with the suction line and being responsive mainly to temperature of refrigerant in the suction line, liquid in said element and said line collecting at the coldest portion thereof, said element responding less promptly to changes in temperature than the portion of said line in contact with the suction line whereby upon a decrease in temperature below a normal operating point pressure imposed upon the valve will be that corresponding to the temperature existing in the portion of said line contacting the suction line permitting prompt response of said valve to the change in temperature while upon an increase in superheat above a normal operating point liquid collected in such portion will evaporate and condense in said element thereby retarding response of said valve to an increase in superheat.

2. In a refrigeration system of the compressor-condenser-expander type, the combination of an expansion valve for regulating passage of refrigerant to the evaporator, first and second thermal responsive members disposed adjacent the suction line of the system, a line connecting said members with the valve, said line and members being gas charged and containing a minor quantity of volatile liquid, a portion of the discharge line being disposed in heat exchange relation with that portion of the suction line adjacent said first member to maintain said member at a higher temperature than the second member so that the second member controls operation of the valve during a normal operating range, said second member having a relatively slow response and said first member having a relatively rapid response to a decrease in temperature in the suction line without the normal operating range whereby, said second member controls operation of the valve during a normal operating range and said first member supersedes the second member in control of the valve when abnormal conditions are encountered resulting in a decrease in temperature in the suction line below the normal operating range.

3. In a refrigeration system of the compressorcondenser-expander type, the combination of an expansion valve for regulating passage of refrigerant to the evaporator, a heat conductive member placed in contact with the suction line of the system and having an opening therein to receive a thermal responsive member, first and second thermal responsive members responsive to temperature of refrigerant in the suction line of the system, said first member having a portion thereof in contact with the suction line of the system and another portion extending away from the suction line exposed to ambient atmosphere whereby the temperature of the first member is greater than the temperature of the second member, said second thermal member being placed in the opening in the heat conductive member, a line connecting said members to the valve, said line and members being gas charged and containing a minor quantity of volatile liquid, said second member having a relatively slow response and said first member having a relatively rapid response to a change in temperature, said second member controlling operation of the valve during a normal operating range and said first member superseding the second member in control of the valve when abnormal conditions are encountered resulting in a decrease in temperature below the normal operating range.

4. In a refrigeration system of the compressor-condenser-expander type, the combination of a thermal expansion valve for regulating passage of refrigerant to the evaporator, said valve including an expansible member, an equalizer line permitting suction pressure to be imposed against one side of said expansible member and a thermal responsive system for imposing pressure against the opposite side of said expansible member, the thermal responsive system including a member disposed adjacent the suction line and a line connecting said member to the expansion valve, the thermal responsive system being gas charged and containing a minor quantity of liquid in said member in the coldest portion thereof, said member including connected chambers responding at different speeds to changes in temperature in the suction line whereby the liquid accumulates in the chamber having a more rapid response upon a decrease in superheat so that the pressure imposed on the expansible member by said system corresponds to the temperature in such chamber while upon an increase in superheat the liquid evaporates and condenses in the chamber having a slower response thereby retarding the response of the expansion valve to the change in superheat.

5. In a refrigeration system of the compressor-condenser-expander type, the combination of an expansion valve for regulating passage of refrigerant to the evaporator, said valve including an expansible member, a thermal responsive element disposed adjacent the suction line connected to said valve for imposing pressure on one side of the expansible member, an equalizer line connecting the suction line with the valve to impose pressure against the opposite side of said expansible member, and means in said equalizer line for retarding response of said valve to an increase in temperature in the suction line while permitting prompt response of the valve to a decrease in temperature in the suction line.

6. A system according to claim 5 in which said means include a check valve and a restriction by-passing said check valve adapted to permit limited gaseous flow from one side of the valve member in the check valve to the opposite side whereby upon an increase in superheat said check valve closes and pressure on one side of said valve member is permitted to bleed slowly therefrom through said restriction thus retarding action of the expansion valve while upon a decrease in superheat said check valve opens permitting prompt response of the expansion valve.

7. In a method of operation of a thermal expansion valve disposed in a refrigeration system of the compressor-condenser-expander type, the steps which consist in automatically actuating the expansion valve to respond promptly to a decrease in temperature in the suction line during operation of the system and automatically retarding normal response of the expansion valve to an increase in temperature in the suction line during operation of the system.

8. In a method of regulating operation of a thermal expansion valve disposed in a refrigeration system of the compressor-condenser-expander type, in which the expansion valve is controlled by means of a thermal responsive system disposed in proximity to the suction line, the thermal responsive system being gas charged and containing a minor quantity of liquid, the steps which consist in collecting the liquid in one portion of the system in response to a decrease in superheat in the suction line during operation of the system whereby the pressure imposed upon the diaphragm of the expansion valve is that which corresponds to the temperature of such portion of the system and prompt response of the valve is caused, and in response to an increase in superheat in the suction line during operation of the system, evaporating the liquid in such portion of the system and condensing it in a second portion of the system whereby response of the valve to such increase in superheat is retarded.

9. In a refrigeration system of the compressor-condenser-expander type, the combination of an expansion valve for regulating flow of refrigerant to the evaporator of the system, a thermal responsive system responsive to temperature in the suction line for actuating the expansion valve to move toward open or closed positions, said thermal responsive system including means exterior of the valve responsive to temperature of refrigerant in the suction line for retarding the action of the expansion valve when suction line temperatures increase during operation of the compressor of the refrigeration system, and means exterior of the valve in physical contact with the suction line responsive to temperature of refrigerant in the suction line to supersede said retarding means to provide prompt response of the valve to decrease in suction line temperature during operation of the compressor of the refrigeration system.

10. In a refrigeration system of the compressor-condenser-expander type, the combination of an expansion valve for regulating flow of refrigerant to the evaporator, a thermal responsive system responsive to temperature in the suction line for actuating the expansion valve to move toward open or closed positions, said thermal responsive system being gas charged and containing a minor amount of liquid, said system including means exterior of the valve responsive to temperature of refrigerant in the suction line for actuating the expansion valve to move toward open or closed positions during a normal operating range, and means exterior of the valve responsive to temperature of refrigerant in the suction line to supersede said first means in controlling the expansion valve upon a decrease in temperature in the suction line below the normal operating range.

11. In a refrigeration system of the compressor-condenser-expander type, the combination of a thermal expansion valve for regulating flow of refrigerant to the evaporator, a thermal responsive system for actuating the valve, said system including a plurality of heat responsive members connected to said valve, each member being responsive to a change in temperature in the suction line of the refrigeration system, one of said members having a relatively slow response and another having a relatively rapid response to a decrease in temperature in the suction line below a normal operating range, said rapid response member being disposed in contact with the suction line of the refrigeration system, a portion of the discharge line of the refrigeration system being disposed in heat exchange relation with such portion of the suction line, the member having a relatively slow response controlling operation of the valve during the normal operating range, said member having a relatively rapid response superseding the slower member in control of the valve upon a decrease in temperature in the suction line below the normal operating range.

12. In a refrigeration system of the compressor-condenser-expander type, the combination of a thermal expansion valve for regulating flow of refrigerant to the evaporator, a thermal responsive system for actuating the valve, said system including a plurality of heat responsive members connected to said valve, each member being responsive to a change in temperature in the suction line of the refrigeration system, one of said members having a relatively slow response and another having a relatively rapid response to a decrease in temperature in the suction line of the refrigeration system below a normal operating range, said rapid response member comprising a coiled capillary tube placed adjacent the suction line and having portions spaced helically thereof in physical contact with the suction line of the refrigeration system and other portions of the coil extending away from the suction line exposed to ambient atmosphere whereby during a normal operating range the temperature of said rapid response member is greater than the temperature of the slow response member, the member having a relatively slow response controlling operation of the valve during the normal operating range, the rapid response member superseding the slower member in control of the valve upon a decrease in temperature in the suction line below the normal operating range.

13. In a refrigeration system of the compressor-condenser-expander type, the combination of a thermal expansion valve for regulating passage of a refrigerant to the evaporator, said valve including an expansible member, an equalizer line permitting suction pressure to be imposed against one side of said expansible member and a thermal responsive system for imposing pressure against the opposite side of said expansible member, the thermal responsive system including a member responsive to temperature of refrigerant in the suction line of the refrigeration system and a line connecting said member to the expansion valve, the thermal responsive system being gas charged and containing a minor quantity of liquid in said member in the coldest portion thereof, said member including elements responding at different speeds to changes in temperature in the suction line whereby the liquid accumulates in the element having a more rapid response upon a decrease in superheat so that the pressure imposed on the expansible member by said thermal responsive system corresponds to the temperature in such element while upon an increase in superheat the liquid evaporates and condenses in the element having a slower response thereby retarding the response of the expansion valve to the change in superheat.

14. A regulating member for a thermal expansion valve which comprises a first element having a wall of predetermined thickness responsive to temperature of refrigerant in the suction line of a refrigeration system and capable of responding rapidly to a change in temperature in the suction line of the refrigeration system, a second element having a wall of greater thickness than the first element responsive to temperature of refrigerant in the suction line of the refrigeration system and capable of responding less rapidly than the first element to a change in temperature in the suction line of the refrigeration system, said elements being so arranged that the charge in the first element cannot pass to the second element in other than gaseous form whereby upon a decrease in temperature in the first element the valve responds promptly to such decrease while upon an increase in temperature in such element action of the valve is retarded thereby obviating "hunting" when the valve is in use.

WILLIAM L. McGRATH.

REFERENCES CITED

The following references are of record in the file of this patent:

UNITED STATES PATENTS

| Number | Name | Date |
| --- | --- | --- |
| 1,971,695 | Ploeger | Aug. 28, 1934 |
| 2,133,963 | McCloy | Oct. 25, 1938 |
| 2,147,678 | Smith | Feb. 21, 1939 |
| 2,192,117 | Wile | Feb. 27, 1940 |
| 2,199,498 | Kaufman | May 7, 1940 |
| 2,242,334 | Wile | May 20, 1941 |
| 2,319,993 | Kaufman | May 25, 1943 |
| 2,475,556 | Seligman | July 5, 1949 |